(12) United States Patent
Ahmed

(10) Patent No.: US 6,512,837 B1
(45) Date of Patent: Jan. 28, 2003

(54) WATERMARKS CARRYING CONTENT DEPENDENT SIGNAL METRICS FOR DETECTING AND CHARACTERIZING SIGNAL ALTERATION

(75) Inventor: Farid Ahmed, Beaverton, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/689,250

(22) Filed: Oct. 11, 2000

(51) Int. Cl.$^7$ .............................. H04T 1/00
(52) U.S. Cl. ............................ 382/100
(58) Field of Search .............. 382/100, 232; 380/210, 252, 287, 54; 713/176

(56) References Cited

U.S. PATENT DOCUMENTS

| | | | |
|---|---|---|---|
| 5,617,119 A | 4/1997 | Briggs et al. | 345/611 |
| 5,646,997 A * | 7/1997 | Barton | 380/23 |
| 5,721,788 A | 2/1998 | Powell et al. | 382/100 |
| 5,825,892 A | 10/1998 | Braudaway et al. | 380/51 |
| 5,841,886 A | 11/1998 | Rhoads | 382/115 |
| 5,933,798 A | 8/1999 | Linnartz | 702/191 |
| 5,974,548 A | 10/1999 | Adams | 713/200 |
| 6,064,764 A * | 5/2000 | Bhaskaran et al. | 382/183 |
| 6,065,119 A * | 5/2000 | Sandford, II et al. | 713/200 |
| 6,240,121 B1 | 5/2001 | Senoh | 375/130 |
| 6,246,777 B1 * | 6/2001 | Agarwal et al. | 382/100 |
| 6,275,599 B1 | 8/2001 | Alder et al. | 382/100 |
| 6,285,775 B1 * | 9/2001 | Wu et al. | 382/100 |

FOREIGN PATENT DOCUMENTS

EP 1 041 815 A2 * 10/2000 ............ H04N/1/32

OTHER PUBLICATIONS

Szepanski, W., "A Signal Teoretic Method for Creating Forgery–Proof Documents for Automatic Verification," *IEEE Proc. 1979 Carnahan Conf. on Crime Countermeasures*, May 1979, pp. 101–109.*

Matthews, R., "When Seeing is not Believing," *New Scientist*, No. 1895, Oct. 16, 1993, pp. 13–15.*

Friedman, G. L., "The Trustworthy Digital Camera: Restoring Credibility to the Photographic Image," *IEEE Trans. Consumer Electronics*, vol. 39, No. 4, Nov. 1993, pp. 905–910.*

Walton, S., "Image Authentication for a Slippery New Age," *Dr. Dobb's Journal*, Apr. 1995, pp. 18–20, 22, 24, 26, 82 and 84–87.*

Schneider, M., "A Robust Content Based Digital Signature for Image Authentication, " *IEEE Proc. Int. Conf. on Image Processing*, Sep. 1996, pp. 227–230 (vol. 3).*

Lin, C.–Y. et al., "Generating Robust Digital Signature for Image/Video Authentication," *Proc. Multimedia and Security Workshop at ACM Multimedia'98*, Sep. 1998, pp. 49–54.*

(List continued on next page.)

*Primary Examiner*—Andrew W. Johns
(74) *Attorney, Agent, or Firm*—Joel R. Meyer; Digimarc Corporation

(57) ABSTRACT

The invention provides methods and systems for detecting and characterizing alterations of media content, such as images, video and audio signals, using watermark messages to carry signal metrics. By comparing signal metrics extracted from the watermark to signal metrics calculated from a suspect signal, a watermark decoder can detect and even classify types of alterations to the watermarked signal.

18 Claims, 2 Drawing Sheets

OTHER PUBLICATIONS

Dittmann, J., "Chapter 3: Telltale Watermarking," in *Multiresolution Digital Watermarking: Algorithms and Implications for Multimedia Signals*, Ph.D. thesis at Univ. of Toronto, 1999, pp. 23–52.*

Lin, C.-Y. et al., "Issues and Solutions for Authenticating MPEG Video," *Proc. SPIE vol. 3657: Security and Watermarking of Multimedia Contents*, Jan. 1999, pp. 54–65.*

Xie, L. et al., "Secure MPEG Video Communications by Watermarking," *Proc. Conf. of ATIRP (Advanced Telecommunications and Information Distribution Research Project)*, Feb. 1999, pp. 459–462.*

Dittmann, J. et al., "Content–based Digital Signature for Motion Pictures Authentication and Content–Fragile Watermarking," *IEEE Proc. Int. Conf. on Multimedia Computing and Systems*, Jun. 1999, pp. 209–213.*

Lamy, P. et al., "Content–Based Watermarking for Image Authentication," *Proc. $3^{rd}$Int. Workshop on Information Hiding*, Sep./Oct. 1999, pp. 187–198.*

Queluz, M. P. et al., "Spatial Watermark for Image Verification," *Proc. SPIE vol. 3971: Security and Watermarking of Multimedia Contents II*, Jan. 2000, pp. 120–130.*

Sun, Q. et al., "VQ–based digital signature scheme for multimedia content authentication," *Proc. SPIE vol. 3971: Security and Watermarking of Multimedia Contents II*, Jan. 2000, pp. 404–416.*

Xie, L. et al., "Methods for Soft Image/Video Authentication," *Proc. Conf. of ATIRP (Advanced Telecommunications and Information Distribution Research Project)*, Mar. 2000, 5 pages.*

Rey, C. et al., "Blind Detection of Malicious Alterations on Still Images using Robust Watermarks," *Proc. IEE Seminar on Secure Images and Image Authentication*, Apr. 2000, pp. 7/1–7/6.*

Bassali et al., "Compression Tolerant Watermarking for Image Verification," *IEEE Proc. Int. Conf. on Image Processing*, vol. 1, Sep. 2000 pp. 434–437.

Frequently Asked Questions, Epson Image Authentication System (IAS), Oct. 5, 1999, 3 pages.

U.S. Provisional application No. 60/180,364, Davis et al., filed Feb. 4, 2000.

U.S. Provisional application No. 60/198,138, Alattar, filed Apr. 17, 2000.

U.S. Provisional application No. 60/198,857, Davis et al., filed Apr. 21, 2000.

U.S. patent application No. 09/198,022, Rhoads, filed Nov. 23, 1998.

U.S. patent application No. 09/525,865, Davis et al., Mar. 15, 2000.

U.S. patent application No. 09/625,577, Carr et al., Jul. 25, 2000.

U.S. patent application No. 09/645,779, Tian et al., filed Aug. 24, 2000.

* cited by examiner

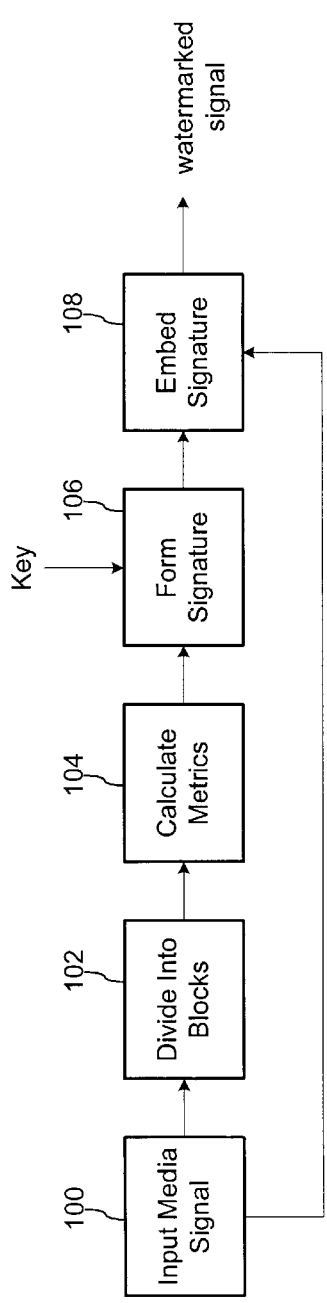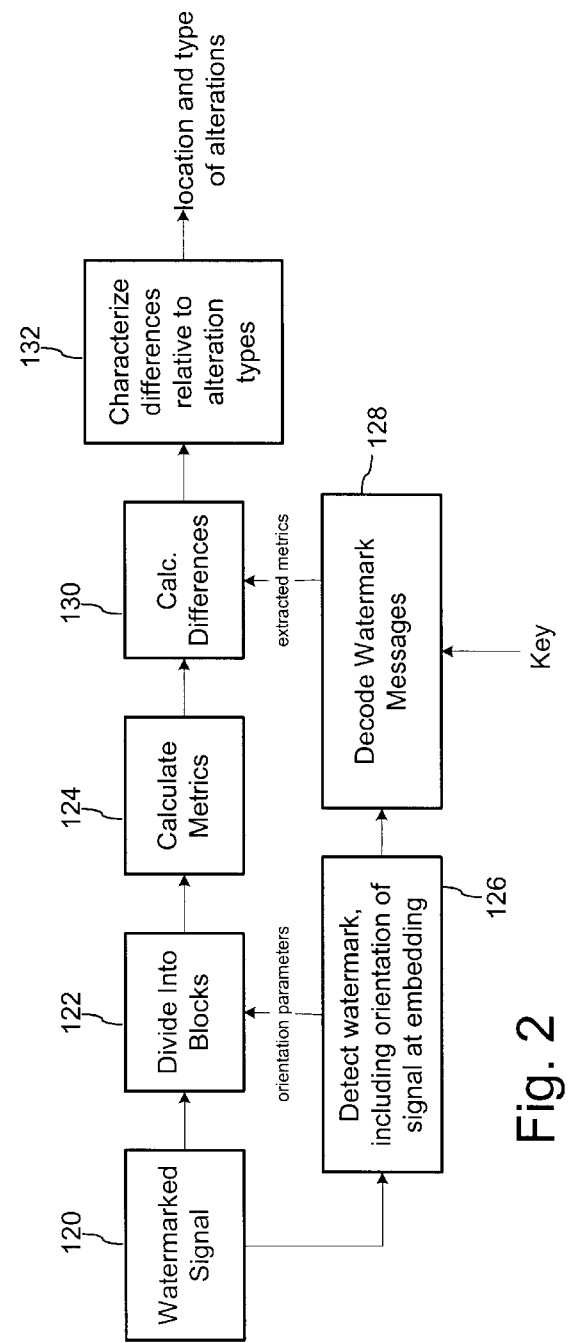

Fig. 3

| Processing | Velocity | Temporal | Spatial | Histogram Difference | Histogram variance | Histogram Mean Intensity | Variance Intensity | Low-freq content |
|---|---|---|---|---|---|---|---|---|
| Brightening | tiny | tiny | medium | small | small | large | tiny | large |
| Despeckle | large | medium | small | large | large | tiny | large | medium |
| Gaussian Noise | large | medium | small | large | large | tiny | medium | small |
| Median Filter (3X3) | large | large | small | large | medium | small | large | large |
| Scaling | large | small | small | large | medium | small | medium | medium |
| Compression (QF 3) | large | small | small | large | large | tiny | tiny | small |
| Compression (QF 6) | large | small | tiny | large | medium | tiny | tiny | tiny |
| Motion Blur (angle 2) | large | large | large | large | large | tiny | large | large |
| Sharpening | medium | medium | small | large | medium | tiny | medium | small |
| Watermarked | large | tiny | tiny | large | medium | tiny | small | tiny |

WATERMARKS CARRYING CONTENT DEPENDENT SIGNAL METRICS FOR DETECTING AND CHARACTERIZING SIGNAL ALTERATION

RELATED APPLICATION DATA

The subject matter of the present application is related to that disclosed in U.S. Pat. No. 5,862,260, and in co-pending application Ser. No. 09/234,780, filed Jan. 2, 1999, Ser. No. 09/498,223, filed Feb. 3, 2000, Ser. No. 09/503,881, filed Feb. 14, 2000; Ser. No. 60/198,138, filed Apr. 17, 2000, Ser. No. 09/574,726, filed May 18, 2000, Ser. No. 09/618,948, filed Jul. 19, 2000, Ser. No. 09/625,577, filed Jul. 25, 2000, and Ser. No. 09/645,779, filed Aug. 24, 2000, which are hereby incorporated by reference.

TECHNICAL FIELD

The invention relates to multimedia signal processing, and in particular relates to hiding auxiliary information in media signals like audio, video and image signals, and using the auxiliary information to detect and characterize tampering of the signal.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 5,862,260, which are hereby incorporated by reference.

The invention provides methods and systems for detecting and characterizing alterations of media content, such as images, video and audio signals, using watermark messages to carry signal metrics. By comparing signal metrics extracted from the watermark to signal metrics calculated from a suspect signal, a watermark decoder can detect and even classify types of alterations to the watermarked signal. The watermark decoder localizes the alteration to a given block or set of blocks in the suspect image. To illustrate the alteration, the decoder may display a graphical depiction of the suspect signal, along with the block or blocks that are altered as well as the type of alteration associated with those blocks.

Further features will become apparent with reference to the following detailed description and accompanying drawings.

BRIEF DESCRIPTION OF THE DRAWINGS

FIG. 1 shows a watermark embedding process for encoding content dependent metrics into a watermark for use in detecting and characterizing content alteration.

FIG. 2 shows a watermark decoding process for detecting and characterizing alterations to a watermarked image based on a comparison of signal metrics computed of the watermarked image and extracted from the watermark message.

FIG. 3 is a diagram of a matrix characterizing types of signal alteration relative to changes in signal metrics.

DETAILED DESCRIPTION

FIG. 1 shows a watermark embedding process for encoding content dependent metrics into a watermark for use in detecting and characterizing content alteration. To illustrate the process, consider an example application for detecting alteration of image content. In this example, a watermark embedder divides an input media signal (100) (e.g., a host image) into blocks (102). It then calculates signal metrics for each block (104). The metrics for each block form a signature (106). The embedder quantizes the metrics in the signature and encodes the resulting signature as part of a watermark message in the block using a watermark embedding process (108), such as the methods described in U.S. Pat. No. 5,862,260, and in co-pending application Ser. No. 09/503,881. An additional enhancement of the method is to encrypt each quantized signature with an encryption key. In one implementation, the embedder calculates the signature from a combination of signal metrics in different blocks, and then embeds the signature in one or more blocks using a spread spectrum embedding function.

To illustrate the process, consider an example of three 8 bit quantized metrics per block. The metrics are concatenated to form a 24 bit number and then error correction encoding to create a binary message string. The embedder spread spectrum modulates the message string and maps elements of the resulting signal to locations within an image block (e.g., a block of luminance values). The embedder perceptually adapts the signal to the image block and adds elements in the adapted watermark signal to corresponding luminance values in the block. To increase the robustness of the watermark, the embedder can be designed to repeat the embedding process to redundantly encode the same signature into several blocks.

Other watermark embedding functions may be used as well, such as statistical feature modulation techniques where statistical features of samples in the block are adjusted to correspond to a value associated with a desired message symbol. The statistical features used for watermark embedding may be selected so as not to interfere with statistical features of the signal metrics.

The signal metrics within the signature are quantized such that the metrics are sensitive to certain types of signal alterations, but are relatively insensitive to the changes in the pixel values resulting from embedding the watermark. Preferably, the quantized metrics are the same before and after image watermark embedding. To ensure this is the case, the watermark embedder selects metrics that change less than an acceptable threshold before and after the watermark process. One way to guarantee that the metric is the same before and after encoding is to pick a signal metric that the watermark embedding function does not alter or alters only slightly. For example, the signal metric may be derived from frequency components or regions of the host signal and then embedded into other frequency components or regions of that host signal. As another example, the metric may measure a statistical feature that remains unchanged by the watermark embedding process.

The watermark embedder may also make two or more iterative embedding passes through the image on watermarked blocks in which the quantized signal metrics differ before and after the embedding process. With each pass on a particular image block, the embedder updates the metric, the image block, or both, embeds the metric and stops when the quantized metric is within an acceptable tolerance threshold before and after it is embedded into the image block. One approach is to use the quantized metric of the watermarked block as the updated metric that is embedded in the original image block. In this approach, the metric computed from the watermarked block at each pass is embedded back in the original image block until the signal metric is within an acceptable tolerance before and after embedding.

Another approach is to change the pixel values of the image block slightly on each pass so that the metric is more likely to be the same before and after watermark embedding. One example of this approach is to use the watermarked block in one pass as the input to the next pass. Here, the embedder may re-calculate the metric from the updated image and embed it into the updated image block. Alternatively, it may select a metric computed from a previous pass and embed it into the updated image block.

After watermark embedding is complete, the watermarked image may be printed, distributed electronically, or both. If the image is printed, then it is later scanned with a image scanning device to convert back to a digital form for analysis.

FIG. 2 shows a watermark decoding process for detecting and characterizing alterations to a watermarked image based on a comparison of signal metrics computed of the watermarked image and extracted from the watermark message. The decoder reads the watermarked image (120), divides it into blocks of the same size used in the embedder (122), and calculates metrics that form the signature of each block (124). In some applications, a watermark decoder such as the one described in U.S. Pat. No. 5,862,260, and in co-pending application Ser. No. 09/503,881 may first re-align the watermarked image (126) to approximate its orientation state at the time of computing the signal metric and embedding the watermark.

To determine the orientation state, the decoder detects and determines the orientation of a calibration signal forming part of the watermark. The orientation state is defined by orientation parameters (e.g., rotation, scale, differential scale, shear, and shift or translation) calculated by correlating the calibration signal with the watermarked image. By compensating for geometric distortion before the signal metrics are computed, the decoder approximately aligns the image blocks to their original orientation state before calculating the signal metrics and watermark payload.

The watermark decoder extracts the watermark message payload from each block (128), potentially after re-aligning the image data using the calibration signal embedded in the watermark. Next, the decoder compares the computed signatures with the signatures extracted from the watermark (130). The decoder then provides an indication of the alterations detected and type of alterations based on the differences between the computed and extracted signatures (132). In particular, the signal metrics are known through empirical analysis to degrade in predictable ways in response to certain types of image manipulation, such as compression, scanning, printing, cropping, photocopying, selective swapping of image content, etc. Based on characterizations of these degradations, the decoder translates the degradation of the signal metrics into corresponding signal degradations. It may then display the watermarked signal along with graphic indicators highlighting altered blocks and their corresponding types of alteration.

Some of these metrics are computed for each block and some are based on the difference of information between two consecutive blocks. The size of the block depends on particular application and on the image size. If locating the area of tampering is of more importance, a smaller size is preferable with the constraint that a small sized block metric may not be statistically representative.

The size of the image block used for calculating signal metrics may be the same or different from the size of the block used to embed the watermark message. For example, in cases where the signal metric block size is larger than the watermark block size, the embedder may divide each signal metric block into sub-blocks corresponding to watermark blocks and encode the signal metrics in each of the sub-blocks.

Some examples of signal metrics include:

1. Histogram features of image blocks: histogram difference and histogram variance. The histogram difference metric is calculated as the sum of differences between the histograms of two consecutive blocks, whereas the histogram variance characterizes the brightness contrast of an individual block. One implementation, for example, used a histogram with 64 bins for an image size of 240 by 320 pixels sub-divided into blocks of 40 by 40 pixels each.

2. Motion vectors among spatially or temporally adjacent image blocks. The brightness difference between two consecutive blocks, and the rate of change of this difference are indicators of localized tampering of the signal.

For example, a temporal metric is calculated as the standard deviation of the block intensity differences. A spatial metric is calculated as the variance of edge information of a block. One implementation, for instance, computes horizontal and vertical edge information by separately convolving the image block with a high pass filter (e.g., such as a Sobel filter) in the horizontal and vertical directions. It then computes the sum of squares of each value in the respective high pass filter outputs. Finally, it computes the spatial signal metric as the standard deviation of the sum of squares.

A velocital metric is computed as a statistical measure of the ratio of the temporal over the spatial metrics.

3. Pixel intensity based metrics: average and variance of intensity across the block;

4. Frequency content metrics: ratio of low frequency content to total energy in a block.

In one implementation, the watermark embedder inserts signature comprised of three quantized metrics: a measure of edges in the block (the spatial metric); a motion vector metric calculated as a function of the difference between the block and an adjacent block (the temporal metric), and a ratio of the first and second metrics (the velocital metric).

FIG. 3 is a matrix of characterizations showing how these signal metrics have been found to correspond to types of degradations. The matrix entries indicate the extent to which the metric specified at the head of the column changes after processing specified in the corresponding row. This or a similar matrix may be used to construct a parametric model that characterize a type of alteration based on the extent of changes to each of the signal metrics embedded in the watermark. To characterize a type of alteration to the watermarked signal, the decoder applies the changes measured in the signal metrics to the model, which maps the changes to one or more alteration types. The decoder may then provide visual feedback, displaying the watermarked signal, graphically highlighting the blocks detected as being altered and displaying the type or types of alteration.

The last row of the matrix shows the effect of a form of spatial spread spectrum watermarking, where a spatial, pseudo random watermark image is added to the image. To generate the watermark image, a watermark message is spread over a pseudorandom number and the resulting values mapped to locations in an image block. The watermark image values are perceptual adapted so as to be substantially imperceptible in the watermarked image. As evidenced in the last row, certain metrics are highly sensitive to this type of watermarking process. Thus, if this type of watermark is used to embed signal metrics, it should be used in conjunction with signal metrics that are less sensitive to it, or it should be embedded in parts of the image (e.g., spatial areas or frequencies) that are independent of those from which the signal metric is calculated.

For many applications, signal metrics are typically tuned to detect specific types of alteration, like compression, photocopying, printing, scanning, etc. Knowing that degradation due to photocopying an image is different in the direction the paper is moving compared to its orthogonal direction, one is prompted to choose a pair of metrics that enables a comparison of horizontal and vertical characteristics of an image block. Photocopying of watermarked images can be detected, for example, by encoding horizontal edge information in one metric and vertical edge information in another metric. The extent of the differences in the horizontal and vertical edge information may be used to detect photocopying. In particular, if the watermark decoder measures horizontal or vertical edge information changes that exceed an acceptable tolerance, it deems the image to have been altered. This application of signal metrics is useful in determining whether a printed article is genuine.

Frequency domain analysis and frequency domain watermarks may be used to characterize certain types of signal alteration. In one implementation, a watermark encoder performs a wavelet packet decomposition of an image to calculate a energy distribution signature and embeds this signature into a watermark. The energy distribution signature shows the actual bands (in a complete wavelet packet decomposition) of the embedding of the localization signature which is obtained from the metrics described above.

A wavelet packet decomposition of an image decomposes the image into a tree structure where each child node represents a wavelet decomposition of the original image, or a block of the image. Child nodes are selected for further decomposition if the entropy of the image band at the node is greater than a predetermined entropy threshold.

A compatible watermark decoder analyzes features calculated from a wavelet packet decomposition of a watermarked image to detect alteration. In particular, the watermark decoder analyzes the entropy of selected nodes of the decomposition and detects and characterizes alteration by applying detected changes in entropy at the nodes to a parametric model. This model characterizes certain types of alterations based on how they alter entropy at nodes of the wavelet packet decomposition.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

While the invention is illustrated with reference to images, it also applies to other media types including audio. In the case of audio, the signal metrics may be computed from and embedded into temporal blocks of an audio signal. The watermark embedding may modulate features in the time, frequency, or some other transform domain of the host audio signal block. The signal metrics may be based on statistical features of the time domain audio data or frequency domain audio data. Preferably, the signal metrics are embedded into features of the audio signal block from which they are derived in a manner that does not interfere with the value of the signal metric. In other words, the signal metrics for a block are within an acceptable tolerance before and after watermark embedding of the signal metric. The tolerance level is set so that alterations being detected are distinguishable from slight changes in the signal metrics due to the watermark embedding process. The signal metrics may be computed from data in one set of frequencies and then embedded into another set for each block of audio in an audio signal file. Additionally, the signal metrics may be computed from one set of samples in a block and embedded into another set of samples in the block.

In addition to signal metrics, the watermark may be used to convey other information, such as an identifier of the content, an index to related metadata, rendering control instructions, etc. For example, the watermark can carry a network address or index to a network address to link the watermarked signal to a network resource such as a related web site. Some blocks may be used to carry signal metrics, while others may be used to carry other payload information, such as metadata, or a pointer to metadata stored in an external database.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of detecting alteration of a watermarked media signal comprising:

dividing the watermarked media signal into blocks;

decoding watermark signals from the blocks;

extracting signal metrics from the watermark signals decoded from the blocks;

comparing the signal metrics with corresponding signal metrics computed from the watermarked media signal, wherein a difference between the computed and extracted signal metrics evidences signal alteration;

wherein results of comparing the signal metrics are used to characterize a type of alteration based on a model that maps signal metric changes to alteration types.

2. The method of claim 1 wherein the media signal is an image signal.

3. The method of claim 1 wherein signal metrics are computed for blocks of the media signal such that each block has two or more corresponding signal metrics.

4. The method of claim 3 wherein the signal metrics are computed from and embedded into the same blocks.

5. The method of claim 1 wherein there are at least three metrics, and one metric is a function of two other metrics.

6. The method of claim 1 wherein at least one metric is computed based on edge information in a block of the media signal.

7. The method of claim 6 wherein the media signal comprises an image signal, and at least one metric is compute based on horizontal and vertical edge information.

8. A computer readable medium having software for performing the method of claim 1.

9. A method of detecting alteration of a watermarked media signal comprising:
dividing the watermarked media signal into blocks;
decoding watermark signals from the blocks;
extracting signal metrics from the watermark signals decoded from the blocks;
comparing the signal metrics with corresponding signal metrics computed from the watermarked media signal, wherein a difference between the computed and extracted signal metrics evidences signal alteration;
wherein at least one metric is computed based on differences between adjacent blocks of the media signal.

10. A method of detecting alteration of a watermarked media signal comprising:
dividing the watermarked media signal into blocks;
decoding watermark signals from the blocks;
extracting signal metrics from the watermark signals decoded from the blocks;
comparing the signal metrics with corresponding signal metrics computed from the watermarked media signal, wherein a difference between the computed and extracted signal metrics evidences signal alteration;
wherein a first metric is a function of media signal data in a block, and a second metric is a function of differences between the media signal data of adjacent blocks.

11. The method of claim 10 wherein a third metric is a function of the first and second metrics.

12. A method of detecting alteration of a watermarked media signal comprising:
dividing the watermarked media signal into blocks;
decoding watermark signals from the blocks;
extracting signal metrics from the watermark signals decoded from the blocks;
comparing the signal metrics with corresponding signal metrics computed from the watermarked media signal, wherein a difference between the computed and extracted signal metrics evidences signal alteration;
wherein the metrics include horizontal and vertical edge information metrics, and a change in the horizontal and vertical edge information metrics is used to detect copying.

13. A method for embedding auxiliary information into a media signal for detecting alteration of the media signal, the method comprising:
calculating two or more signal metrics of the media signal; and
performing a watermark embedding process to embed the signal metrics into the media signal, such that the signal metrics are within an acceptable tolerance when computed from the media signal before and after the watermark embedding process;
wherein the signal metrics are selected to detect particular types of alteration and are part of parametric model that classifies the particular types of alteration as a function of the signal metrics.

14. The method of claim 13 including computing the metrics for each of block of a set of blocks of the media signal, and encoding the signal metrics for each block into the media signal.

15. The method of claim 14 wherein the signal metrics are embedded into the same blocks from which they are derived.

16. The method of claim 13 wherein one of the signal metrics is based on edge information of the media signal.

17. A computer readable medium having software for performing the method of claim 15.

18. A method for embedding auxiliary information into a media signal for detecting alteration of the media signal, the method comprising:
calculating two or more signal metrics of the media signal; and
performing a watermark embedding process to embed the signal metrics into the media signal, such that the signal metrics are within an acceptable tolerance when computed from the media signal before and after the watermark embedding process;
wherein the signal metrics include a signal metric derived from differences between adjacent blocks of the media signal and embedded into one of the adjacent blocks.

* * * * *